United States Patent
Watanabe et al.

(10) Patent No.: US 8,659,272 B2
(45) Date of Patent: Feb. 25, 2014

(54) BIDIRECTIONAL BOOST-BUCK DC-DC CONVERTER

(75) Inventors: Yasuto Watanabe, Saitama (JP); Mitsuaki Hirakawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 208 days.

(21) Appl. No.: 13/388,766

(22) PCT Filed: Aug. 3, 2010

(86) PCT No.: PCT/JP2010/063092
§ 371 (c)(1),
(2), (4) Date: Feb. 3, 2012

(87) PCT Pub. No.: WO2011/016449
PCT Pub. Date: Feb. 10, 2011

(65) Prior Publication Data
US 2012/0134180 A1 May 31, 2012

(30) Foreign Application Priority Data
Aug. 5, 2009 (JP) .................................. 2009-182896

(51) Int. Cl.
*G05F 1/24* (2006.01)
*G05F 1/00* (2006.01)

(52) U.S. Cl.
USPC ............................. 323/259; 323/271; 323/344

(58) Field of Classification Search
USPC ................... 323/259, 271, 272, 225, 344, 345
See application file for complete search history.

(56) References Cited

U.S. PATENT DOCUMENTS

| | | | |
|---|---|---|---|
| 8,111,052 B2* | 2/2012 | Glovinsky | 323/225 |
| 2009/0180305 A1 | 7/2009 | Hashino et al. | |
| 2010/0002477 A1 | 1/2010 | Hasegawa et al. | |

FOREIGN PATENT DOCUMENTS

| | | |
|---|---|---|
| CN | 101589540 A | 11/2009 |
| DE | 11 2008 000 189 T5 | 12/2009 |
| EP | 2081287 A1 | 7/2009 |
| JP | 2006-149054 A | 6/2006 |
| JP | 2007-194474 A | 8/2007 |
| JP | 2008-182815 A | 8/2008 |
| JP | 2008-192931 A | 8/2008 |
| JP | 2009-170620 A | 7/2009 |
| JP | 2009-266978 A | 11/2009 |
| WO | 2008-090968 A1 | 7/2008 |

OTHER PUBLICATIONS

International Search Report international application No. PCT/JP2010/063092 dated Nov. 2, 2010.

* cited by examiner

*Primary Examiner* — Bao Q Vu
*Assistant Examiner* — Zekre Tsehaye
(74) *Attorney, Agent, or Firm* — Squire Sanders (US) LLP

(57) ABSTRACT

To provide a DC/DC converter capable of down-sizing magnetic components and varying boosting and bucking ratios, and a bidirectional boosting-bucking operations, a bidirectional boosting-bucking magnetic-field cancellation type of DC/DC converter (10) is provided which includes: a first voltage side port (P1), a second voltage side port (P2); a common reference terminal (CP), a smoothing capacitor (C1), four switching elements (SW1, SW2, SW3, SW4), an inductors (L1, L2), a magnetic-field cancellation type transformer T including a primary winding (L3) and a secondary winging (L4), four switching elements (SW5, SW6, SW7, SW8), and a smoothing capacitor (C2).

12 Claims, 10 Drawing Sheets

(a)

(b)

(a)

(b)

(a)

(b)

(a)

(b)

US 8,659,272 B2

BIDIRECTIONAL BOOST-BUCK DC-DC CONVERTER

TECHNICAL FIELD

The present invention relates to a DC/DC converter, particularly to a DC/DC converter capable of bidirectional boosting-bucking operations with a small size and a light weight and suitable for use in electric vehicles, etc.

BACKGROUND ART

Conventionally, as a power converter for an electric system or electric assist systems for vehicles, a DC/DC converter has been disclosed which can vary a boosting (bucking) ratio with a magnetic cancellation type transformer (see, for example, patent document 1). The DC/DC converter has such a configuration that a boosting-and-bucking-ratio-variable inductor and a magnetic field cancellation type of transformer are disposed between an input terminal and a plurality of switching elements.

Such a configuration provides continuous boosting-bucking operations and down-sizes the inductor and the transformer, which provides a small size and light weight boosting-bucking type of DC/DC converter.

PRIOR ART

Patent Document

[Patent Document 1] JP 2006-149054 A

SUMMARY OF INVENTION

Problem to be Solved by Invention

However, though the above-described conventional art DC/DC converter provides a bi-directional power conversion, regarding the direction, either of boosting or bucking can be done.

The present invention is made in consideration of the above-described problem to provide a DC/DC converter capable of down-sizing magnetic components, varying boosting and bucking ratios, and doing the boosting-bucking operations in both directions.

DISCLOSURE OF THE INVENTION

Means for Solving Problem

To solve the problem, the DC/DC converter according to claim 1 of the present invention is characterized by: a first-voltage-side port that is a first positive electrode, a second-voltage-side port that is a second positive electrode, a common reference terminal, a plurality of switching elements, a plurality of inductors, and a transformer, characterized in that:
one end of the first switching element (SW1) and one end of the second switching element (SW2) are connected to the first voltage-side port; wherein
one end of the first inductor (11) is connected to an other end of the first switching element (SW1); wherein
one end of the second inductor (L2) is connected to an other end of the second switching element (SW2); wherein
one end of the third switching element (SW3) is connected to the other end of the first switching element (SW1); wherein
one end of the fourth switching element (SW4) is connected to the other end of the second switching element (SW2); wherein
other ends of the third switching element (SW3) and the fourth switching element (SW4) are connected to the common reference terminal; wherein
the transformer (T) comprises a magnetic-field cancellation type transformer comprising:
a primary winding and a secondary winding,
wherein
the primary winding (L3) and the secondary winding (L4) are magnetically coupled with each other through a core and have substantially the same winding ratios with an opposite direction connection; wherein
one end of the primary winding (L3) is connected to an other end of the first inductor (L1); wherein
one end of the secondary winding (L4) is connected to an other end of the second inductor (L2); wherein
one end of the fifth switching element (SW5) and one end of sixth switching element (SW6) are connected to the second-voltage-side port; wherein
an other end of the fifth switching element (SW5) is connected to an other end of the primary winding (L3); wherein
an other end of the sixth switching element (SW6) is connected to an other end of the secondary winding (L4); wherein
one end of the seventh switching element (SW) is connected to the other end of the primary winding; wherein
one end of the eighth switching element (SW8) is connected to the other end of the secondary winding;
other ends of the seventh switching element (SW7) and the eighth switching element are connected to the common reference terminal.

Such a configuration provides a bidirectional boosting-bucking magnetic-field cancellation type of DC/DC converter including two switch parts respectively formed with four switching elements installed at former and rear stages of the magnetic component formed with the first and second inductors and the magnetic-field cancellation type transformer. Accordingly, boosting by the switching operation by one of switch parts and bucking by the other switch part can be performed. In other words, this provides bi-directional boosting and bucking operations.

The DC/DC converter according to claim 2 of the present invention is, in the DC/DC converter according to claim 1, on-and-off control signals are supplied by a controller externally installed to the seventh and eighth switching elements to control on-and-off operations of the respective seventh and eighth switching elements alternately to boost the first voltage to the second voltage.

Such a configuration provides, in the bidirectional boosting-bucking magnetic-field cancellation type of DC/DC converter defined by claim 1, a forward boosting operation mode in which the first voltage is boosted to the second voltage by alternately switching the seventh and eighth switching elements.

In addition, the DC/DC converter defined by claim 3 of the present invention is characterized in that, in the bidirectional boosting-bucking magnetic-field cancellation type of DC/DC converter defined by claim 1, on-off control signals are supplied by a controller externally installed to the fifth and sixth switching elements to alternately control on-off operations of the respective fifth and sixth switching elements to buck the second voltage to the first voltage.

Such a configuration provides, in the bidirectional boosting-bucking magnetic-field cancellation type of DC/DC converter defined by claim 1, a reverse bucking operation mode in which the second voltage is bucked to the first voltage by alternately switching the fifth and sixth switching elements.

The DC/DC converter defined by claim 4 of the present invention is characterized in that, in the bidirectional boosting-bucking magnetic-field cancellation type of DC/DC converter defined by claim 1, on-off control signals are supplied by a controller externally installed to the first and second switching elements to alternately control on-off operations of the respective first and second switching elements to buck the first voltage to the second voltage.

Such a configuration provides, in the bidirectional boosting-bucking magnetic-field cancellation type of DC/DC converter defined by claim 1, a forward bucking operation mode in which the first voltage is bucked to the second voltage by alternately switching the first and second switching elements.

The DC/DC converter defined by claim 5 of the present invention is characterized in that, in the bidirectional boosting-bucking magnetic-field cancellation type of DC/DC converter defined by claim 1, on-off control signals are supplied by a controller externally installed to the third and fourth switching elements to alternately control on-off operations of the respective third and fourth switching elements to boost the second voltage to the first voltage.

Such a configuration provides, in the bidirectional boosting-bucking magnetic-field cancellation type of DC/DC converter defined by claim 1, a reverse boosting operation mode in which the second voltage is boosted to the first voltage by alternately switching the third and fourth switching elements.

The DC/DC converter defined by claim 6 of the present invention is characterized in that, in the bidirectional boosting-bucking magnetic-field cancellation type of DC/DC converter defined by claim 1, the controller externally installed supplies on-off control signals are supplied by a controller externally installed to the fifth to eighth switching elements to alternately control on-off operations of the respective fifth and seventh switching elements and on-off control signals to the sixth and eighth switching elements to alternately control on-off operations of respective the sixth and eighth switching elements to boost the first voltage to the second voltage and buck the second voltage to the first voltage at different timing.

Such a configuration provides, in the bidirectional boosting-bucking magnetic-field cancellation type of DC/DC converter defined by claim 1, a seamless operation mode between the forward boosting operation from the first voltage to the second voltage and the reverse bucking operation from the second voltage to the first voltage for continuously switching between a mode in which the fifth and seventh switching elements are alternately switched and a mode in which the sixth and eighth switching elements are alternately switched without any mode switching operation.

The DC/DC converter defined by claim 7 of the present invention is characterized in that, in the bidirectional boosting-bucking magnetic-field cancellation type of DC/DC converter defined by claim 1, the controller externally installed supplies, in the DC/DC converter defined by claim 1, on-off control signals are supplied by a controller externally installed supplies to the first to fourth switching elements to alternately control on-off operations of the respective first and third switching elements, and on-off control signals to the respective second and fourth switching elements to alternately control on-off operations of the respective second and fourth switching elements to buck the first voltage to the second voltage and boost the second voltage to the first voltage at different timing.

Such a configuration provides, in the bidirectional boosting-bucking magnetic-field cancellation type of DC/DC converter defined by claim 1, a seamless operation mode between the forward bucking operation from the first voltage to the second voltage and the reverse boosting operation from the second voltage to the first voltage for continuously switching between a mode in which the first and third switching elements are alternately switched and a mode in which the second and fourth switching elements are alternately switched without any mode switching operation.

In the DC/DC converter defined by claim 8 of the present invention, the core of the magnetic-field cancellation type transformer, in the DC/DC converter defined by claim 1, comprises:

a magnetic leg portion around which the primary and secondary windings are individually wound, the magnetic leg portion forming a magnetic closed circuit by a magnetic field generated by the primary and secondary windings; and a base fixing the magnetic leg portion, forming the magnetic closed circuit together with the magnetic leg portion; wherein the magnetic leg portion comprises:

a middle leg portion around which the primary and the secondary windings are wound; and an outer leg portion formed side by side with the middle leg portion.

Such a configuration makes, in the bidirectional boosting-bucking magnetic-field cancellation type of DC/DC converter defined by claim 1, the magnetic-field cancellation type transformer as a magnetic component is small-sized and weight-reduced.

In the DC/DC converter defined by claim 9 of the present invention, the core of the magnetic-field cancellation type transformer, in the DC/DC converter defined by claim 1, comprises:

a magnetic leg portion around which the primary and secondary windings are wound such that the primary and secondary windings are alternately piled, the magnetic leg portion forming a magnetic closed circuit by a magnetic field generated by the primary and secondary windings; and a base, fixing the magnetic leg portion, forming the magnetic closed circuit together with the magnetic leg portion, wherein the magnetic leg portion comprises:

a middle leg portion around which the primary and the secondary windings are wound; and an outer leg portion formed side by side with the middle leg portion.

Such a configuration makes, in the bidirectional boosting-bucking magnetic-field cancellation type of DC/DC converter defined by claim 1, the magnetic-field cancellation type transformer as magnetic components are small-sized and weight-reduced.

In the DC/DC converter defined by claim 10 of the present invention, the core of the magnetic-field cancellation type transformer, in the DC/DC converter defined by claim 1, comprises:

a magnetic leg portion around which the primary and secondary windings are individually wound, the magnetic leg portion forming a magnetic closed circuit by a magnetic field generated by the primary and secondary windings; and a base, fixing the magnetic leg portion, forming the magnetic closed circuit together with the magnetic leg portion; wherein the magnetic leg portion comprises:

a middle leg portion around which the primary and the secondary windings are wound; and an outer leg portion formed side by side with the middle leg portion, wherein a first inductor core and a second inductor core are vertically disposed one on another on at least a position facing the middle leg portion, wherein, the primary winding is wound around the middle leg portion and commonly used as a coil for the first inductor and wound around the first inductor core, and wherein the secondary winding is wound around the middle leg portion and commonly used as a coil for the second inductor and wound around the second inductor core.

Such a configuration makes, the first inductor, the second inductor, and the magnetic-field cancellation type transformer forming magnetic components in the DC/DC converter defined by claim 1, are small-sized and weight-reduced.

In the DC/DC converter defined by claim 11 of the present invention, the first to eighth switching elements in the DC/DC converter defined by claim 1, preferably comprise Insulated Gate Bipolar Transistor (IGBT) with flywheel diodes.

Such a configuration, in the DC/DC converter defined by claim 1, can cause first to eighth switching elements to have large current and high-voltage resistivity characteristics.

In the DC/DC converter defined by claim 12 of the present invention, the first to eighth switching elements DC/DC converter defined by claim 1, preferably comprise Metal Oxide Semiconductor Field Effect Transistors (MOSFET).

Such a configuration, in the bidirectional boosting-bucking magnetic-field cancellation type of DC/DC converter defined by claim 1, can cause first to eighth switching elements to have high speed and high frequency characteristics.

Advantageous Effect of Invention

According to the DC/DC converter, a DC/DC converter is provided which is capable of down-sizing the magnetic components, varying boosting and bucking ratios, and doing the boosting and bucking operation in both directions.

Accordingly, it can be realized that components of the power converter for the electric and electric assist systems for vehicles have a high function, a small size, and a light-weight as well as a high reliability and a low manufacturing cost.

MODE FOR CARRYING OUT THE INVENTION

Figure 1:
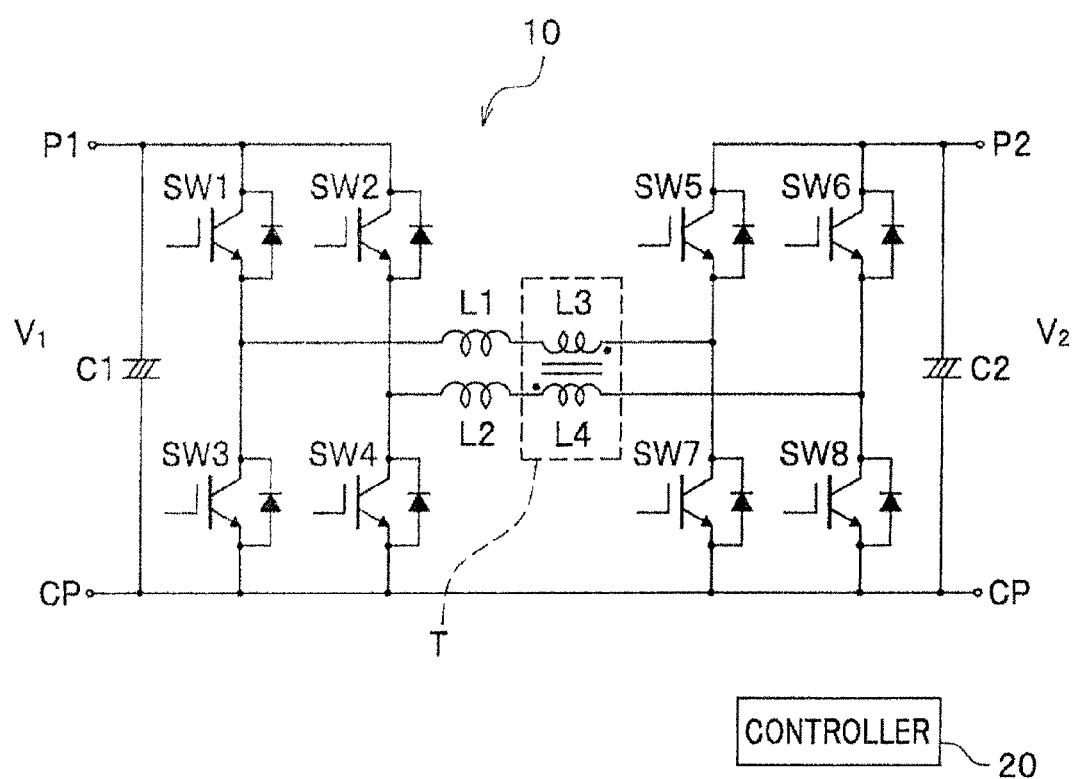
FIG. 1 is a circuit diagram for illustrating a configuration of a bidirectional boosting-bucking magnetic field cancellation type of DC/DC converter according to the present invention.

With reference to FIGS. 1 to 11 will be described embodiments of DC/DC converter according to the present invention. Parts having the same or similar functions and operations in the drawings are designated with the same reference, and thus descriptions will be omitted.

Embodiments

With reference to FIG. 1, will be described a bidirectional boosting-bucking magnetic-field cancellation type of DC/DC converter 10 according to the embodiments of the present invention.

In FIG. 1, the bidirectional boosting-bucking magnetic-field cancellation type of DC/DC converter 10 is shown as a four-terminal circuit. The bidirectional boosting-bucking magnetic-field cancellation type of DC/DC converter 10 is configured to include a first voltage side port P1 and a common reference terminal CP, a second voltage side port P2, and the common reference terminal CP. A controller 20 is provided outside of the bidirectional boosting-bucking magnetic-field cancellation type of DC/DC converter 10.

The bidirectional boosting-bucking magnetic-field cancellation type of DC/DC converter 10 includes a smoothing capacitor C1, four switching elements SW1, SW2, SW3, and SW4 corresponding to first to fourth switching elements, inductors L1, L2 corresponding to the first and second inductors, the magnetic-field cancellation type transformer T, four switching elements SW5, SW6, SW7, and SW8 corresponding to the fifth to eighth switching elements, and a smoothing capacitor C2.

The smoothing capacitor C1 is connected between the common reference terminal CP and the first voltage side port P1. The smoothing capacitor C2 is connected between the common reference terminal CP and the second voltage side port P2. When a DC voltage V1 is inputted into the first voltage side port P1, a DC voltage V2 is outputted at a second voltage side port P2. The first voltage side port P1 and the second voltage side port P2 are both positive (plus) terminals.

The magnetic-field cancellation type of transformer T is formed with a core, a primary winding L3, and a secondary winding L4. The primary winding L3 and the secondary winding L4 are connected to have a connection relation of opposite windings and a ratio of windings are substantially the same. Dot marks added to the respective primary winding L3 and the secondary winding L4 indicate a high potential side when a voltage is induced. More specifically, because in the magnetic-field cancellation type transformer T, the primary winding L3 is magnetically coupled with the secondary winding L4 through the core and winding ratios are substantially the same, when an excitation current flows through one of the winding, voltages corresponding to a ratio of turns of the priority and secondary windings are induced on the other winding. The primary winding L3 and the secondary winding L4 are thickly magnetically coupled because the primary winding L3 and L4 are connected on a core to have a connection relation by an opposite winding connection. This cancels DC magnetic fluxes in the core, so that magnetic saturation of the core can be prevented. Accordingly, the bidirectional boosting-bucking magnetic-field cancellation type of DC/DC converter 10 can be down-sized.

As each of eight of the switching elements SW1 to SW8, for example, an IGBT with a flywheel diode having a large current and high voltage resistive characteristic are used. In addition, in a case where a high speed and high frequency response are necessary, MOSFETs can be used at need. In addition, SiC transistors and GaN transistors, etc., having high voltage resistivity and environmental characteristics as a switching element can be used.

As a circuit configuration of the bidirectional boosting-bucking magnetic-field cancellation type of DC/DC converter 10, in FIG. 1, the switching elements SW1 and SW2 at one ends are connected to the first voltage side port P1 which is a positive terminal, and the inductor L1 is connected at the other end thereof to the other end of the switching element SW1. The inductor L2 is connected at one end thereof to the other end of the switching element SW2. The switching element SW3 is connected at one end thereof to the other end of the switching element SW1. The switching element SW4 is connected at one end thereof to the other end of the switching element SW2, and the other ends of the switching element SW3 and the switching element SW4 are connected to the common reference terminal CP.

A primary winding L3 and a secondary winding L4 form the magnetic-field cancellation type transformer T. One end of the primary winding L3 is connected to the other end of the inductor L1. One end of the secondary winding L4 is connected at one end thereof to the other end of the inductor L2. One ends of the switching element SW5 and the switching element SW6 are connected to a second voltage side port P2 which is positive, the other end of the switching element SW5 is connected to the other end of the primary winding L3, and the other end of the switching element SW6 is connected to the other end of the secondary winding L4. The switching element SW 7 is connected at one end thereof to the other end of the primary winding L3, the switching element SW8 is connected at one end thereof to the other end of the secondary winding L4, and the other ends of the switching element SW7 and the switching element SW8 are connected to the common reference terminal CP.

The gate terminals of eight of the switching element SW1 to the switching element SW8 are supplied with gate signals for controlling on-off operations of respective switching elements from the controller 20.

Next, with reference to FIG. 2, will be described a forward boosting operation mode of the bidirectional boosting-bucking magnetic-field cancellation type of DC/DC converter 10 according to the present invention.

In the forward boosting operation mode, the controller 20 supplies the on-off control signals to eight of the switching element SW1 to the switching element SW8. Control signals are supplied to the switching elements at such timings as shown at a lower part of FIG. 2 to turn always on the switching element SW1 and the switching element SW2, turn always off the switching elements 3 and 4, turn always off the switching element SW5 and the switching element SW6, and alternately turn on and off the switching element SW7 and the switching element SW8. As a result, a first voltage V1 is boosted to a second voltage V2.

Figure 2:
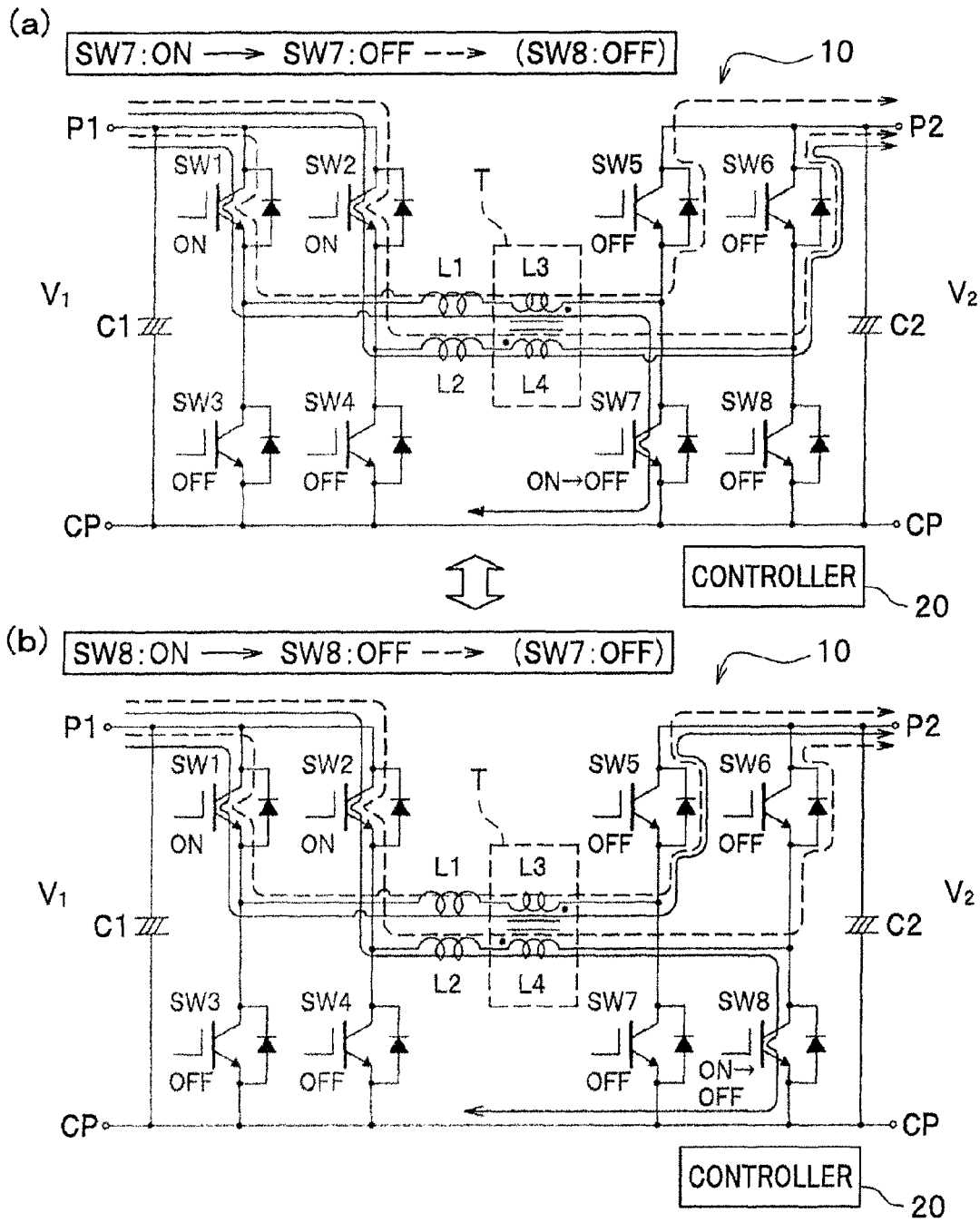
FIG. 2 is a circuit diagram for illustrating a forward boosting operation mode of the bidirectional boosting-bucking magnetic field cancellation type of DC/DC converter according to the present invention.

FIG. 2 (a) shows current flows in the bidirectional boosting-bucking magnetic-field cancellation type of DC/DC converter 10 when the switching element SW7 is in an on-state and when the switching element SW7 becomes in an off-state from an off-state. During this, the switch SW8 is in an off-state. In FIG. 2 (a), a solid-line arrow indicates a current flow in the on-state of the switching element SW7 and a broken-line arrow indicates a current flow when the switching element SW7 becomes in the off-state.

When the switching element SW7 is in the on-state, and the switching element SW8 is in an off-state, because the switching element SW1 and the switching element SW2 are always in on-sates, a current flows through the inductor L1 and the primary winding L3 of the magnetic-field cancellation type transformer T from the first voltage side port P1 via the switching element SW1. During this, a voltage is generated in the secondary winding L4 of the magnetic-field cancellation type transformer T, and a current flows through the inductor L2 and the secondary winding L4, generating an output V2 at the second voltage side port P2 through a diode of the switching element SW6 which is always in an off-state. During this, a magnetic energy is accumulated in the inductor L1 and the inductor L2.

When the switching element SW7 becomes in the off-state while the switching element SW8 is kept in the off-state, a current flows from the first voltage side port P1 to the inductor L1 and the primary winding L3 of the magnetic-field cancellation type transformer T through the switching element SW1 by the magnetic energy accumulated in the inductor L1 and the inductor L2 and is released at the second voltage side port P2 through a diode of the switching element SW5 which is always in the off-state. Similarly, a current flows through the inductor L2 and the primary winding L4 of the magnetic-field cancellation type transformer T from the first voltage side port P1 via the switching element SW2 by the magnetic energy accumulated in the inductor L1 and the inductor L2 and is released at the second voltage side port P2 through the diode of the switching element SW6 which is always in the off-state.

Next, FIG. 2 (b) shows current flows in the bidirectional boosting-bucking magnetic-field cancellation type of DC/DC converter 10 when the switching element SW8 is in the on-state and when the switching element SW8 becomes in an off-state from the on-state. During this the switching element SW7 is in the off-state. In FIG. 2 (b), the solid-line arrow indicates a current flow when the switching element SW8 is the on-state, and the broken-line arrow indicates a current flow when the switching element SW8 is in the off-state.

First, when the switching element SW8 is in the on-state and the switching element SW7 is in the off-state, because the switching element SW1 and the switching element SW2 are always in the on-states, a current flows from the first voltage side port P1 to the inductor L2 and the secondary winding L4 of the magnetic-field cancellation type transformer T through the switching element SW2. During this, a voltage is generated at the inductor L1 and the primary winding L3 of the magnetic-field cancellation type transformer T in the primary winding L3 of the magnetic-field cancellation type transformer T, and a current flows through the inductor L1 and the primary winding L3, generating an output V2 at the second voltage side port P2 through a diode of the switching element SW5 which is always in the off-state. During this, a magnetic energy is accumulated in the inductor L1 and the inductor L2.

Next, when the switching element SW8 becomes in the off-state while the switching element SW7 is kept in the off-state, a current flows from the first voltage side port P1 through the inductor L2 and the secondary winding L4 of the magnetic-field cancellation type transformer T via the switching element SW2 by the magnetic energy accumulated in the inductor L1 and the inductor L2 and is released at the second voltage side port P2 through a diode of the switching element SW6 which is always in the off-state. Similarly, a current flows from the first voltage side port P1 to the inductor L1 and the primary winding L3 of the magnetic-field cancellation type transformer T through the switching element SW1 by the magnetic energy accumulated in the inductor L1 and the inductor L2 and is released at the second voltage side port P2 through the diode of the switching element SW5 which is always in the off-state.

As described above, in the forward boosting operation mode, the alternately turning-on-and-off operation of the switching element SW7 and the switching element SW8 can boost the first voltage V1 to the second voltage V2.

Next, with reference to FIG. 3 will be described a reverse bucking operation mode of the bidirectional boosting-bucking magnetic-field cancellation type of DC/DC converter 10 according to the present embodiment.

In the reverse bucking mode, similarly, the controller 20 supplies the on-and-off-control signals to eight of the switches SW1 to SW8 respectively. Control signals are supplied to the switching elements at such timings as shown at a lower part of FIG. 3 to turn always on the switching element SW1 and the switching element SW2, turn always off the switching element SW7 and the switching element SW8, and alternately turn on and off the switching element SW5 and the switching element SW6. As a result, the second voltage V2 is bucked to the first voltage V1.

Figure 3:
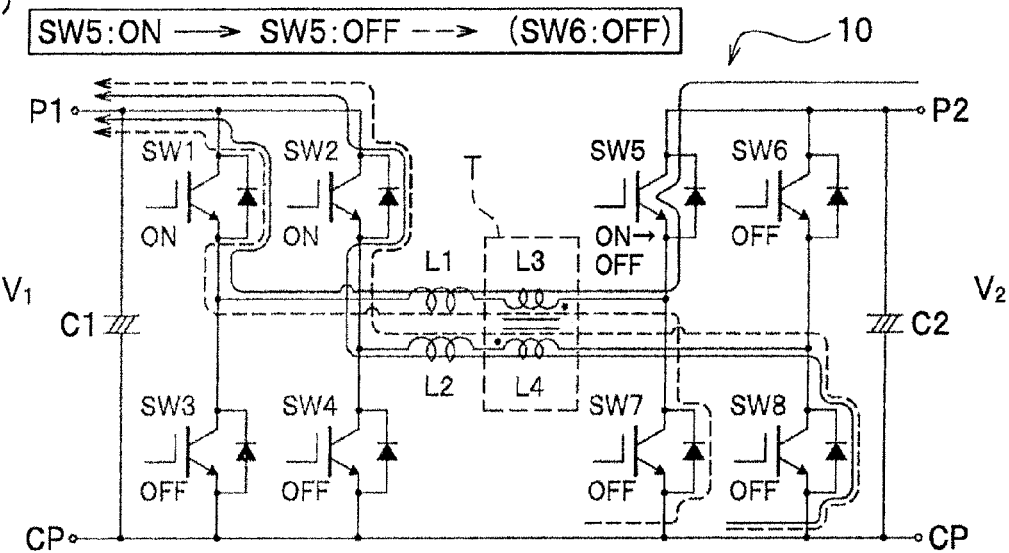
FIG. 3 is a circuit diagram for illustrating a reverse bucking operation mode of the bidirectional boosting-bucking magnetic field cancellation type of DC/DC converter according to the present invention.
Figure 3:
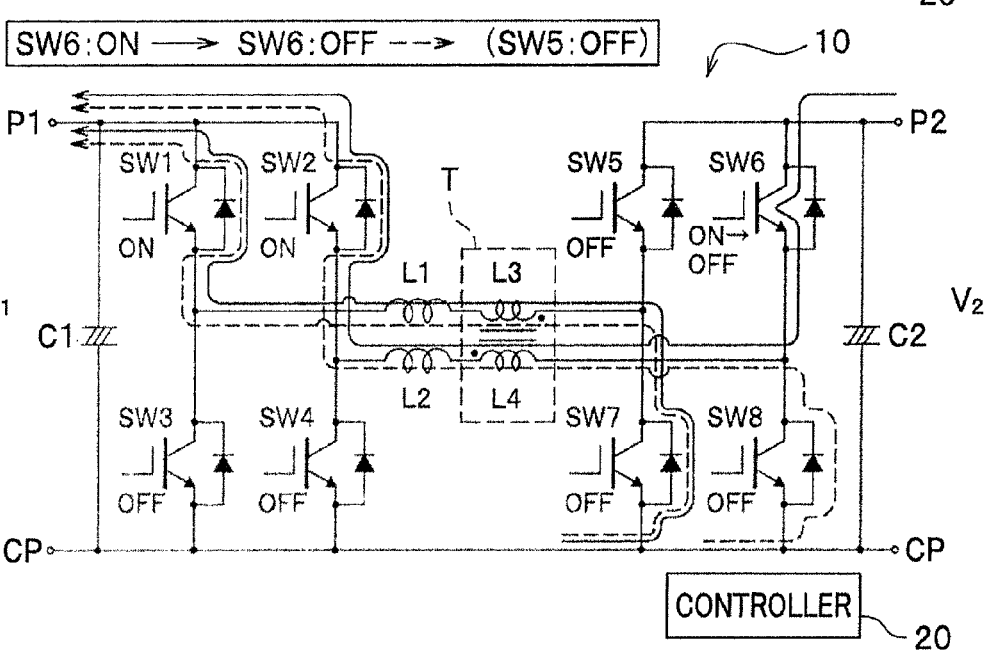

FIG. 3 (a) shows a current flow in the bidirectional boosting-bucking magnetic-field cancellation type of DC/DC converter 10 when the switching element SW5 is in an on-state and when the switching element SW5 becomes in an off-state from the on-state. During this, the switch SW6 is in an off-state. In FIG. 3 (a), a solid-line arrow indicates a current flow in the on-state of the switching element SW5 and a broken-line arrow indicates a current flow when the switching element SW5 becomes in the off-state.

First, when the switching element SW5 is in the on-state, and the switching element SW6 is in the off-state, because the switching element SW1 and the switching element SW2 are always in on-sates, a current flows through the primary winding L3 of the magnetic-field cancellation type transformer T and the inductor L1 from the second voltage side port P2 via the switching element SW5. During this, a voltage is generated in the secondary winding L4 of the magnetic-field cancellation type transformer T, and a current flows through the secondary winding L4 and the inductor L2, generating an output V1 at the first voltage side port P1 through a diode of the switching element SW2 which is always in an on-state. During this, a magnetic energy is accumulated in the inductor L1 and the inductor L2.

Next, when the switching element SW5 becomes in an off-state while the switching element SW6 is kept in the off-state, a current flows through the primary winding L3 of the magnetic-field cancellation type transformer T and the inductor L1 from the common reference terminal CP via a diode of the switching element SW7 by the magnetic energy accumulated in the inductor L1 and the inductor L2 and is released at the first voltage side port P1 through a diode of the switching element SW1 which is always in the on-state. Similarly, a current flows from the common reference terminal CP through the secondary winding L4 of the magnetic-field cancellation type transformer T and the inductor L2 via the switching element SW8 by the magnetic energy accumulated in the inductor L1 and the inductor L2 and is released at the first voltage side port P1 through the diode of the switching element SW2 which is always in the on-state.

Next, FIG. 3 (b) shows a current flow in the bidirectional boosting-bucking magnetic-field cancellation type of DC/DC converter 10 when the switching element SW6 is in an on-state and when the switching element SW6 becomes in the off-state from the on-state. During this the switching element SW5 is in the off-state. In FIG. 3 (b), the solid-line arrow indicates a current flow when the switching element SW6 is the on-state, and the broken-line arrow indicates a current flow when the switching element SW6 becomes in the off-state.

First, when the switching element SW6 is in the on-state and the switching element SW5 is in the off-state, because the switching element SW1 and the switching element SW2 are always in the on-states, a current flows from the second voltage side port P2 to the secondary winding L4 of the magnetic-field cancellation type transformer T and the inductor L2 through the switching element SW6. During this, a voltage is generated at the primary winding L3 of the magnetic-field cancellation type transformer T, and a current flows through the primary winding L3 and the inductor L1, generating an output V1 at the first voltage side port P1 through a diode of the switching element SW1 which is always in an on-state. During this, a magnetic energy is accumulated in the inductor L1 and the inductor L2.

Next, when the switching element SW6 becomes in the off-state while the switching element SW5 is kept in the off-state, a current flows from the common reference terminal CP through the primary winding L3 of the magnetic-field cancellation type transformer T and the inductor L1 via the diode of the switching element SW7 by the magnetic energy accumulated in the inductor L1 and the inductor L2 and is released at the first voltage side port P1 through a diode of the switching element SW1 which is always in the on-state. Similarly, a current flows from the common reference terminal CP through the secondary winding L4 of the magnetic-field cancellation type transformer T and the inductor L2 via the switching element SW8 by the magnetic energy accumulated in the inductor L1 and the inductor L2 and is released at the first voltage side port P1 through the diode of the switching element SW2 which is always in the on-state.

As described above, in the reverse bucking operation mode, the alternately-turning-on-and-off operation of the switching element SW5 and the switching element SW6 can buck the second voltage V2 to the first voltage V1.

Next, with reference to FIG. 4, will be described a forward bucking operation mode of the bidirectional boosting-bucking magnetic-field cancellation type of DC/DC converter 10 according to the present embodiment.

In the forward bucking mode, the controller 20 supplies the on-and-off-control signals to eight of the switches SW1 to SW8 respectively. The control signals are supplied to the switching elements at such timings as shown at the lower part of FIG. 4 to turn always off the switching elements SW1 and SW2, to turn always on the switching element SW5 and the switching element SW6, turn always off the switching element SW7 and the switching element SW8, and alternately turn on and off the switching element SW1 and the switching element SW2. As a result, the first voltage V1 is bucked to the second voltage V2.

Figure 4:
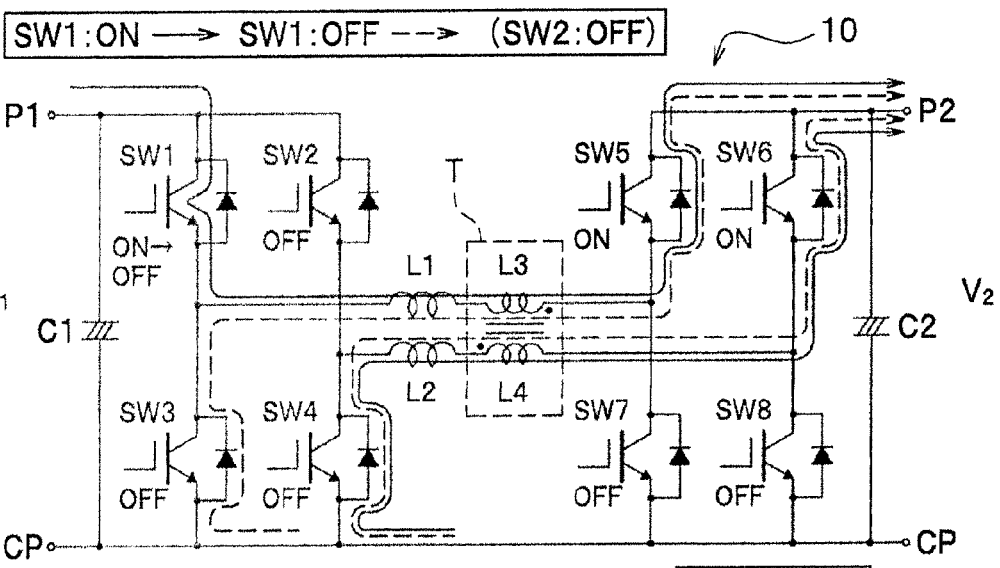
FIG. 4 is a circuit diagram for illustrating the forward bucking operation mode of the bidirectional boosting-bucking magnetic field cancellation type of DC/DC converter according to the present invention.
Figure 4:
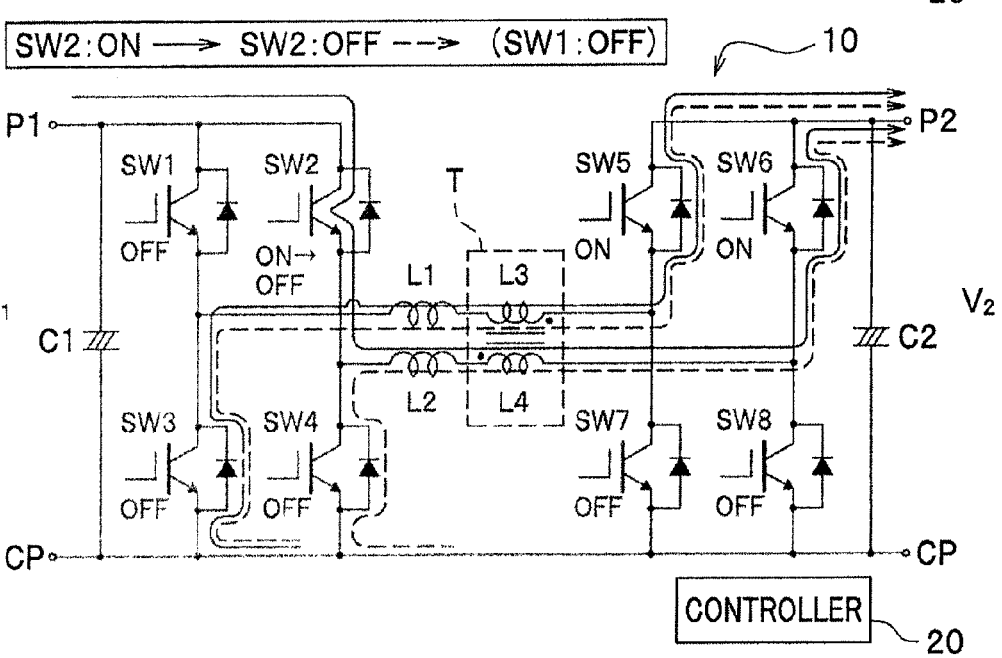

FIG. 4 (a) shows a current flow in the bidirectional boosting-bucking magnetic-field cancellation type of DC/DC converter 10 when the switching element SW1 is in an on-state and when the switching element SW1 becomes in an off-state from the on-state. During this, the switch SW2 is in an off-state. In FIG. 4 (a), a solid-line arrow indicates a current flow in the on-state of the switching element SW1 and a broken-line arrow indicates a current flow when the switching element SW1 becomes in an off-state.

First, when the switching element SW1 is in the on-state, and the switching element SW2 is in the off-state, a current flows through the inductor L1 and the primary winding L3 of the magnetic-field cancellation type transformer T from the first voltage side port P1 via the switching element SW1. During this, a voltage is generated in the secondary winding L4 of the magnetic-field cancellation type transformer T, and a current flows through the inductor L2 and the secondary winding L4, generating an output V2 at the second voltage side port P2 through a diode of the switching element SW6 which is always in an on-state. During this, a magnetic energy is accumulated in the inductor L1 and the inductor L2.

Next, when the switching element SW1 becomes in the off-state while the switching element SW2 is kept in the off-state, a current flows through the inductor L1 and the inductor L3 from the common reference terminal CP via a diode of the switching element SW3 by the magnetic energy accumulated in the inductor L1 and the inductor L2 and is released at the second voltage side port P2 through a diode of the switching element SW5 which is always in the on-state. Similarly, a current flows from the common reference terminal CP through the inductor L2 and the primary winding L4 of the magnetic-field cancellation type transformer T via the switching element SW4 by the magnetic energy accumulated in the inductor L1 and the inductor L2 and is released at the second voltage side port P2 through the diode of the switching element SW6 which is always in the on-state.

Next, FIG. 4 (b) shows a current flow in the bidirectional boosting-bucking magnetic-field cancellation type of DC/DC converter 10 when the switching element SW2 is in an on-state and when the switching element SW2 becomes in the off-state from the on-state. During this the switching element SW1 is in the off-state. In FIG. 4 (b), the solid-line arrow indicates a current flow when the switching element SW2 is the on-state, and the broken-line arrow indicates a current flow when the switching element SW2 becomes in the off-state.

First, when the switching element SW2 is in the on-state and the switching element SW1 is in an off-state, a current flows from the first voltage side port P1 to the inductor L2 and the secondary winding L4 of the magnetic-field cancellation type transformer T through the switching element SW2. During this, a voltage is generated at the primary winding L3 of the magnetic-field cancellation type transformer T, and a current flows through the inductor L1 and the primary winding L3, generating the output V2 at the second voltage side port P2 through a diode of the switching element SW5 which is always in an on-state. During this, a magnetic energy is accumulated in the inductor L1 and the inductor L2.

Next, when the switching element SW2 becomes in the off-state while the switching element SW1 is kept in the off-state, a current flows from the common reference terminal CP through the inductor L1 and the primary winding L3 of the magnetic-field cancellation type transformer T via the diode of the switching element SW3 by the magnetic energy accumulated in the inductor L1 and the primary winding L2, and is released at the second voltage side port P2 through a diode of the switching element SW5 which is always in the on-state. Similarly, a current flows from the common reference terminal CP through the inductor L2 and the secondary winding L4 of the magnetic-field cancellation type transformer T via the switching element SW4 by the magnetic energy accumulated in the inductor L1 and the inductor L2 and is released at the second voltage side port P2 through the diode of the switching element SW6 which is always in the on-state.

As described above, in the forward bucking operation mode, the alternately-turning-on-and-off operation of the switching element SW1 and the switching element SW2 can buck the first voltage V1 to the second voltage V2.

Next, with reference to FIG. 5, will be described a reverse boosting operation mode of the bidirectional boosting-bucking magnetic-field cancellation type of DC/DC converter 10 according to the present embodiment.

In the reverse bucking mode, similarly the controller 20 supplies the on-and-off-control signals to eight of the switching elements SW1 to SW8 respectively. The control signals are supplied to the switching elements at such timings as shown at the lower part of FIG. 5 to turn always off the switching elements SW1 and SW2 to turn always on the switching element SW5 and the switching element SW6, turn always off the switching element SW7 and the switching element SW8, and alternately turn on and off the switching element SW3 and the switching element SW4. As a result, the second voltage V2 is boosted to the first voltage V1.

Figure 5:
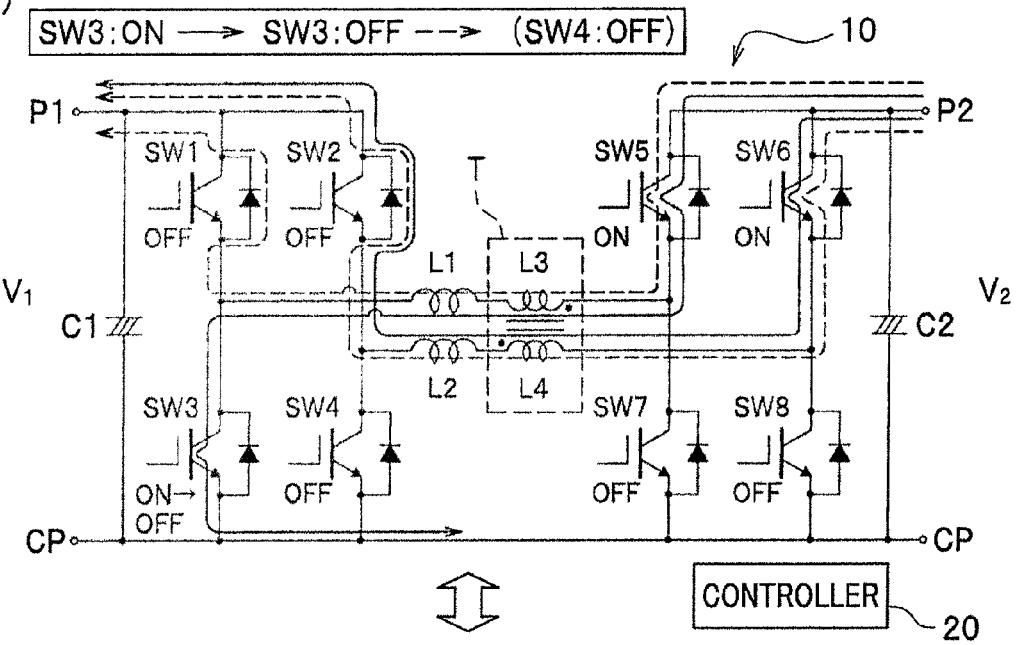
FIG. 5 is a circuit diagram for illustrating the reverse boosting operation mode of the bidirectional boosting-bucking magnetic field cancellation type of DC/DC converter according to the present invention.
Figure 5:
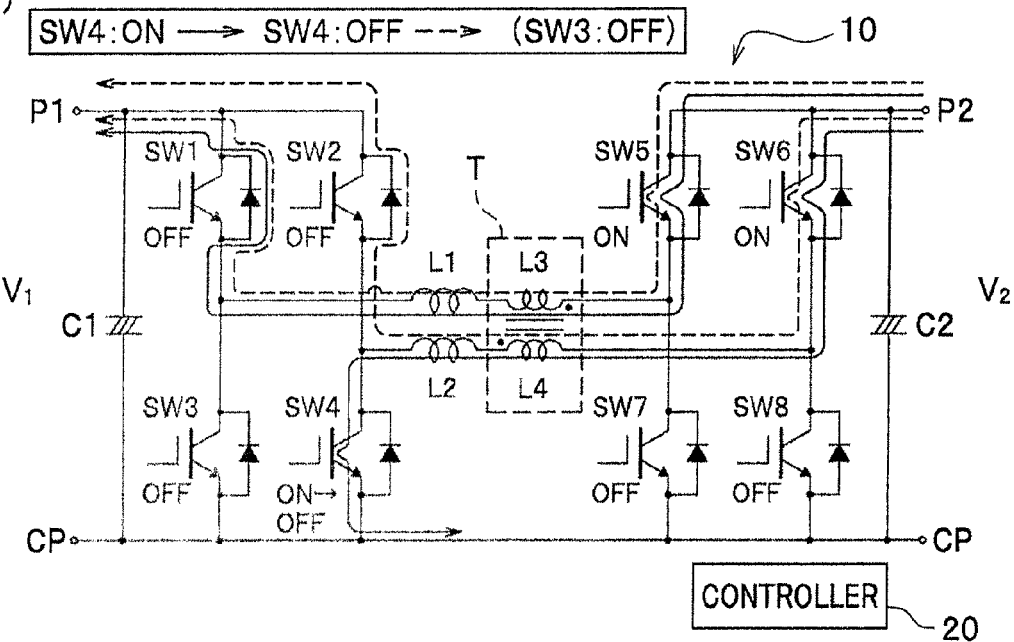

FIG. 5 (a) shows a current flow in the bidirectional boosting-bucking magnetic-field cancellation type of DC/DC converter 10 when the switching element SW3 is in an on-state and when the switching element SW3 becomes in an off-state from the on-state. During this, the switch SW4 is in an off-state. In FIG. 5 (a), a solid-line arrow indicates a current flow in the on-state of the switching element SW3 and a broken-line arrow indicates a current flow when the switching element SW3 becomes in an off-state.

First, when the switching element SW3 is in the on-state, and the switching element SW4 is in the off-state, a current flows through the primary winding L3 of the magnetic-field cancellation type transformer T and the inductor L1 from the second voltage side port P2 via the switching element SW5. During this, a voltage is generated in the secondary winding L4 of the magnetic-field cancellation type transformer T, and a current flows through the secondary winding L4 and the inductor L2, generating an output V1 at the first voltage side port P1 through a diode of the switching element SW2 which is always in an off-state. During this, a magnetic energy is accumulated in the inductor L1 and the inductor L2.

Next, when the switching element SW3 becomes in the off-state while the switching element SW4 is kept in the off-state, a current flows through the primary winding L3 of the magnetic-field cancellation type transformer T and the inductor L1 from the second voltage side port P2 via the switching element SW5 by the magnetic energy accumulated in the inductor L1 and the inductor L2 and is released at the first voltage side port P1 through a diode of the switching element SW1 which is always in the off-state. Similarly, a current flows from the second voltage side port P2 through the primary winding L4 of the magnetic-field cancellation type transformer T and the inductor L2 via the switching element SW6 by the magnetic energy accumulated in the inductor L1 and the inductor L2 and is released at the first voltage side port P1 through the diode of the switching element SW2 which is always in the off-state.

Next, FIG. 5 (b) shows a current flow in the bidirectional boosting-bucking magnetic-field cancellation type of DC/DC converter 10 when the switching element SW4 becomes in the on-state from the off-state. During this the switching element SW3 is in the off-state. In FIG. 5 (b), the solid-line arrow indicates a current flow when the switching element SW4 is the on-state, and the broken-line arrow indicates a current flow when the switching element SW4 becomes in the off-state.

First, when the switching element SW4 is in the on-state and the switching element SW3 is in an off-state, a current flows from the second voltage side port P2 to the secondary winding L4 of the magnetic-field cancellation type transformer T and the inductor L2 via the switching element SW6. During this, a voltage is generated at the primary winding L3 of the magnetic-field cancellation type transformer T, and a current flows through the primary winding L3 and the inductor L1, generating an output V1 at the first voltage side port P1 through a diode of the switching element SW1 which is always in the off-state. During this, a magnetic energy is accumulated in the inductor L1 and the inductor L2.

Next, when the switching element SW4 becomes in the off-state while the switching element SW3 is kept in the off-state, a current flows from the second voltage side port P2 through the primary winding L3 of the magnetic-field cancellation type transformer T and the inductor L1 via the switching element SW5 by the magnetic energy accumulated in the inductor L1 and the inductor L2, and is released at the first voltage side port P1 through a diode of the switching element SW1 which is always in the off-state. Similarly, a current flows from the second voltage side port P2 through the secondary winging L4 of the magnetic-field cancellation type transformer T and the inductor L2 via the switching element SW6 by the magnetic energy accumulated in the inductor L1 and the inductor L2 and is released at the first voltage side port P1 through the diode of the switching element SW2 which is always in the off-state.

As described above, in the reverse boosting operation mode, the alternately-turning-on-and-off operation of the switching element SW3 and the switching element SW4 can boost the second voltage V2 to the first voltage V1.

Next, with reference to FIG. 6, will be described a forward-boosting-reverse-bucking seamless operation mode of the bidirectional boosting-bucking magnetic-field cancellation type of DC/DC converter 10 according to the present embodiment.

The forward-boosting-reverse-bucking seamless operation mode is provided in the bidirectional boosting-bucking magnetic-field cancellation type of DC/DC converter 10, without switching the operation mode between the forward boosting operation mode (see FIG. 2) and the reverse bucking mode (see FIG. 3), described above.

While a motor is driven in the forward boosting operation mode as control of the operation mode, when a regeneration power is generated from a motor, it is necessary to buck the second voltage V2 to the first voltage V1. During this, the switching element SW5 is caused to perform an on-and-off operation which is opposite to the switching element SW7 being making an on-and-off operation, and the switching element SW6 is caused to perform an on-and-off operation which is opposite to the switching element SW8 being making an on-and-off operation. As done like this, the operation can be provided without switching from the forward boosting operation mode for boosting the first voltage V1 to the second voltage V2 to the reverse bucking operation mode for bucking the second voltage V2 to the first voltage V1.

Figure 6:
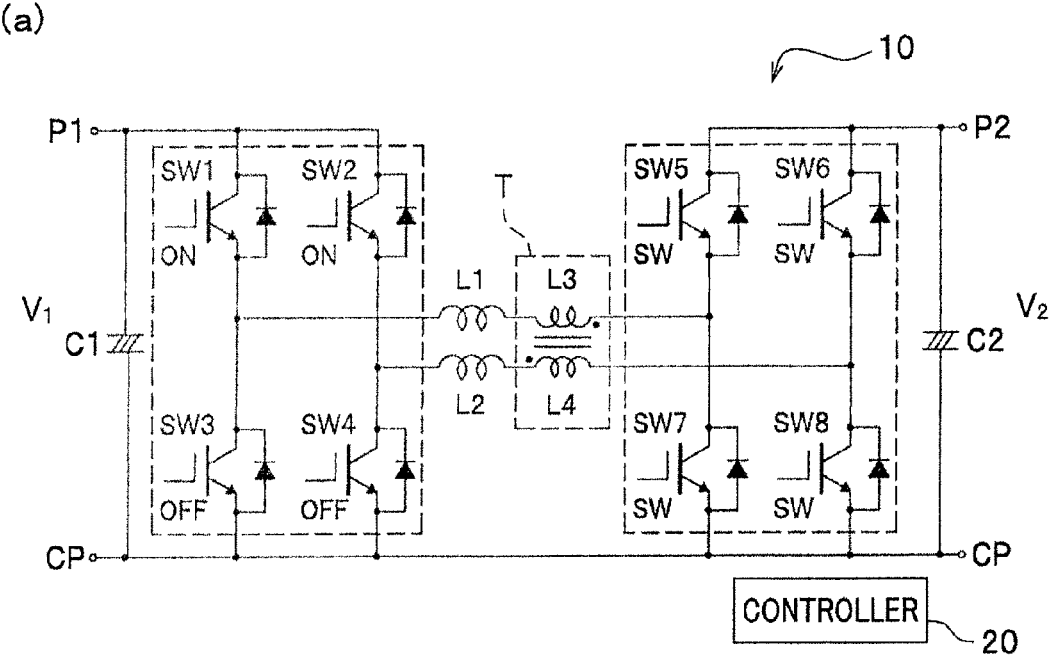
FIG. 6 is a circuit diagram and a timing chart for illustrating a seamless operation mode between the forward boosting operation and the reverse bucking operation of the bidirectional boosting-bucking magnetic-field cancellation type of DC/DC converter according to the present invention.
Figure 6:
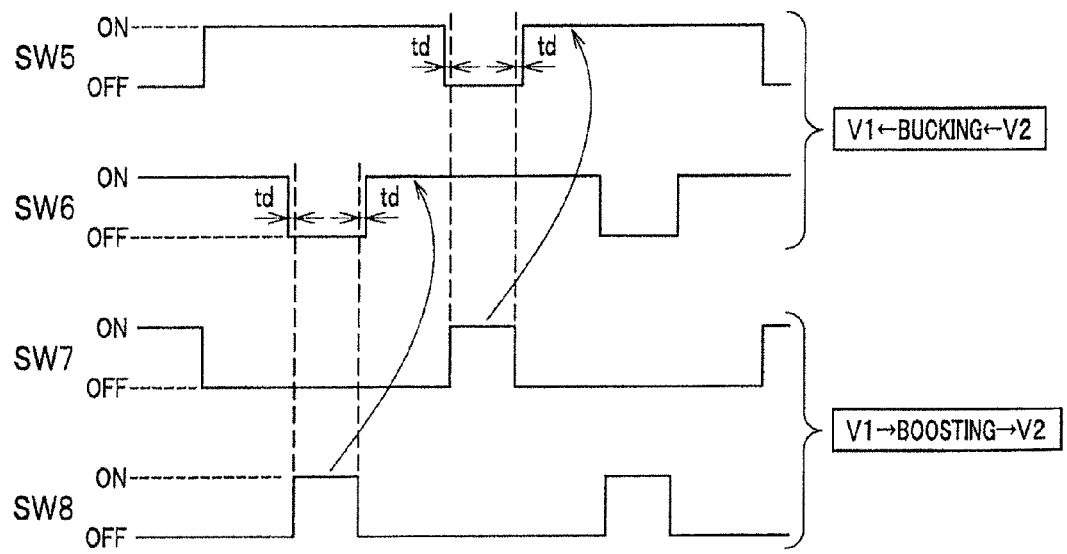

In the forward-boosting-reverse-bucking seamless operation mode, as shown in FIG. 6 (a), the on-and-off control signals are supplied from the controller 20 to the switching element SW1 to the switching element SW8 respectively. The switching element SW1 and the switching element SW2 are always in the on-state, the switching element SW3 and the switching element SW4 are always in the off-state, and the switching element SW5 to the switching element SW8 are switched at such timings as shown at FIG. 6 (b) (this is designated with SW in FIG. 6(a)).

With reference to FIG. 6 (b) will be described the switching timings of the switching element SW5 to SW8. The switching element SW7 and the switching element SW8 are caused to perform an alternately-turning-on-and-off-operation at timings of the forward boosting mode (see FIG. 2). As well as this operation, an inverse operation of the on-and-off operation of the switching element SW7 is made in the switching element SW5, and an inverse operation of the on-and-off operation of the switching element SW8 is made in the switching element SW6. Actually, the switching elements SW5 and SW6 are caused to perform, as shown in FIG. 6 (b), the inverse operation of the turning-on-and-off operations at switching timings of the switching element SW7 and SW8, wherein dead time td is considered respectively.

As done like this, the operation can be provided without switching from the forward boosting operation mode for boosting the first voltage V1 to the second voltage V2 to the reverse bucking operation mode for bucking the second voltage V2 to the first voltage V1.

Doing the forward-boosting-reverse-bucking seamless operation mode can provide an automatic control for a feeding/regenerative operation in real time though a motor drive system status varies.

Next with reference to FIG. 7 will be described the forward-boosting-reverse-bucking seamless operation mode for the bidirectional boosting-bucking magnetic-field cancellation type of DC/DC converter 10 according to the present invention.

In the forward-boosting-reverse-bucking seamless operation mode, the operation can be provided in the bidirectional boosting-bucking magnetic-field cancellation type of DC/DC converter 10 without switching from the forward boosting operation mode (see FIG. 4) to the reverse bucking operation mode (see FIG. 5).

While a motor is driven in the reverse boosting operation mode as control of the operation mode, when it becomes necessary to buck the first voltage V1 to the second voltage V2, the switching element SW1 is caused to perform an on-and-off operation which is inverse to the switching element SW3 being making the on-and-off operation, and the switching element SW2 is caused to perform an on-and-off operation which is inverse to the switching element SW4 being making the on-and-off operation. As done like this, the operation can be provided without switching from the reverse boosting operation mode for boosting the second voltage V2 to the first voltage V1 to the forward bucking operation mode for bucking the first voltage V1 to the second voltage V2.

Figure 7:
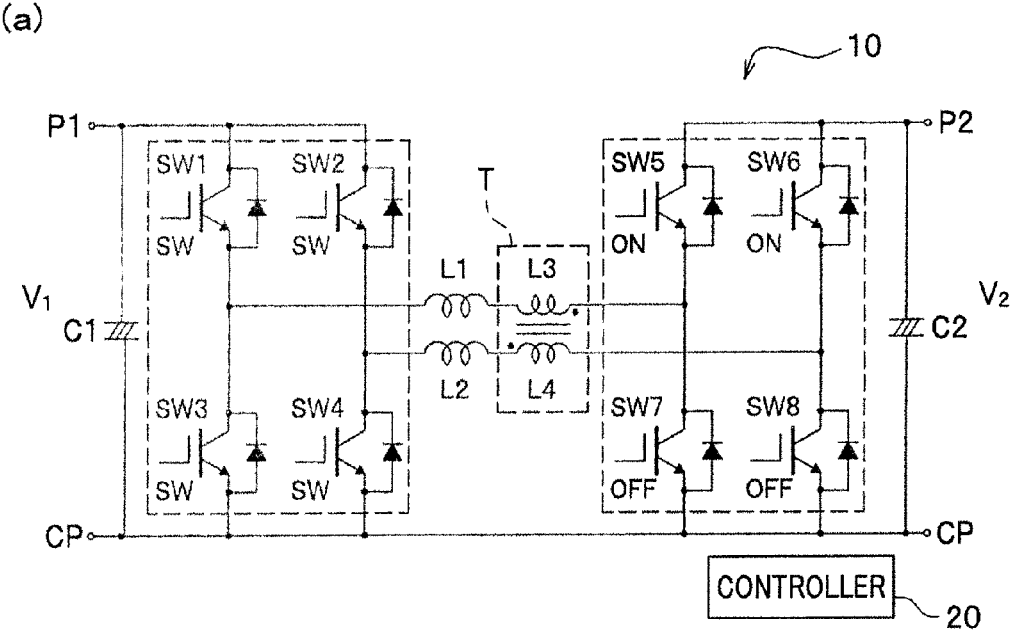
FIG. 7 is a circuit diagram and a timing chart for illustrating a seamless operation mode between a forward bucking operation mode and a reverse boosting operation of the bidirectional boosting-bucking magnetic field cancellation type of DC/DC converter according to the present invention.
Figure 7:
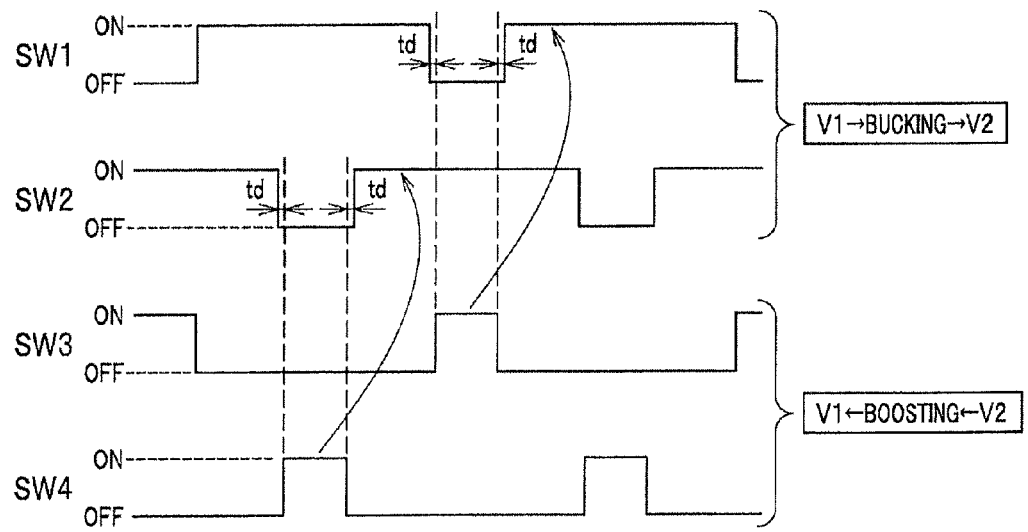

In the forward-bucking-reverse-boosting seamless operation mode, as shown in FIG. 7 (a), the on-and-off control signals are supplied to eight of the switching element SW1 to the switching element SW8 respectively by the controller 20. The switching element SW5 and the switching element SW6 are always in the on-state, the switching element SW7 and the switching element SW8 are always in the off-state, and the switching element SW1 to the switching element SW4 are switched at such timings as shown at FIG. 7(b) (this is designated with SW in FIG. 7(a).

With reference to FIG. 7 (b) will be described the switching timings of the switching element SW1 to SW4. An alternately-turning-on-and-off-operation is made for the switching element SW3 and the switching element SW4 at timings of the rearward boosting mode (see FIG. 5). As well as this operation, an inverse operation of the on-and-off operation of the switching element SW3 is made in the switching element SW1, and an inverse operation of the on-and-off operation of the switching element SW4 is made in the switching element SW2. Actually, the inverse operations of the turning-on-and-off operations of the switching element SW1 and SW2 are respectively made at switching timings of the switching element SW3 and SW4 with dead time td.

As done like this, the operation can be provided without switching from the reverse boosting operation mode for boosting the second voltage V2 to the first voltage V1 to the forward bucking operation mode for bucking the first voltage V1 to the second voltage V2.

Doing the forward-bucking-reverse-boosting seamless operation mode can provide an automatic control for the feeding/regenerative operation in real time though a motor drive system status varies.

Next with reference to FIGS. 8 to 11 will be described the magnetic-field cancellation type transformer T1 to the magnetic-field cancellation type transformer T3 as a specific configuration example of the magnetic-field cancellation type transformer T which is a magnetic component of the bidirectional boosting-bucking magnetic-field cancellation type of DC/DC converter 10.

Figure 8:
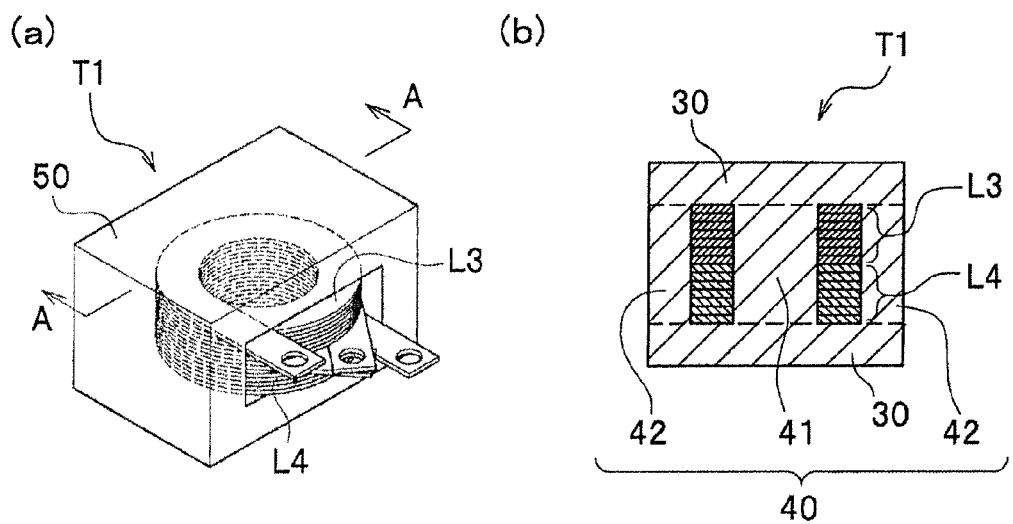
FIG. 8 shows diagrams for illustrating a transformer T1 of the bidirectional boosting-bucking magnetic field cancellation type of DC/DC converter according to the present invention, wherein (a) is a perspective view and (b) is a cross section view.

With reference to FIG. 8 (a) and FIG. 8 (b) will be described the magnetic-field cancellation type transformer T1. FIG. 8 (a) shows a perspective view of the magnetic-field cancellation type transformer T1, and FIG. 8 (b) shows a vertical cross section view taken along line A-A in FIG. 8 (a).

As shown in FIG. 8 (a), the magnetic-field cancellation type transformer T1 is configured to include a core 50, a primary winding L3, and a secondary winding L4. As shown in FIG. 8 (b), the core 50 is configured to include a magnetic leg portion 40 for forming a closed magnetic path caused by a magnetic flux generated by the primary winding L3 and the secondary winding L4 individually wound, bases 30 for fixing the magnetic leg portion 40 between upper one and lower one and forming the magnetic path. The magnetic leg portion 40 is formed with a middle leg portion 41 around which the primary winding L3 and the secondary winding L4 are wound and outer leg portions 42 formed side by side with the middle leg portion 41 (for example, JP application 2008-113326).

As described above, because the primary winding L3 and the secondary winding L4 are individually, regularly, piled, a packaging density can be increased without dispersion of the generated magnetic flux. Accordingly, the magnetic-field cancellation type transformer T forming the magnetic component in the bidirectional boosting-bucking magnetic-field cancellation type of DC/DC converter 10 according to the embodiment can be down-sized and weight-saved.

Figure 9:
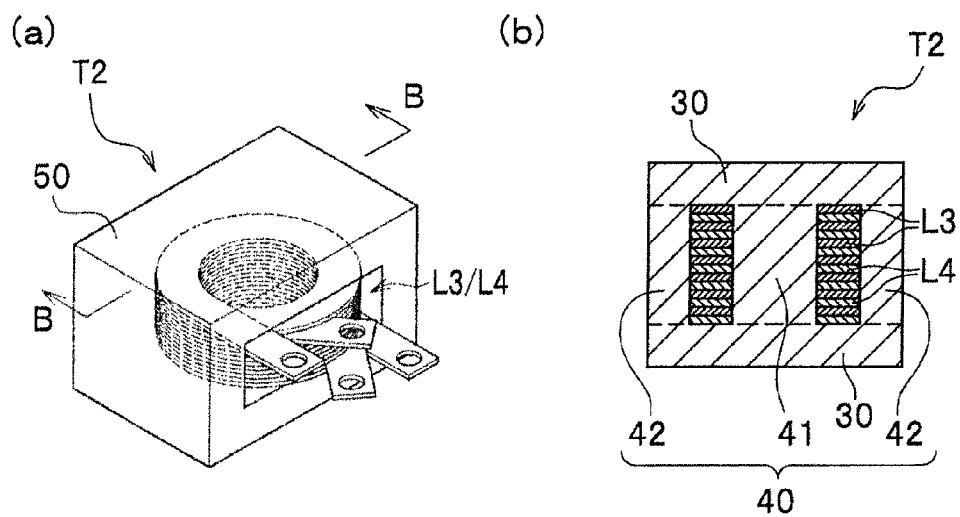
FIG. 9 shows diagrams for illustrating a transformer T2 of the DC converter according to the present invention, wherein (a) is a perspective view and (b) is a cross section view.

Next, with reference to FIG. 9 (a) and FIG. 9 (b) will be described the magnetic-field cancellation type transformer T2. FIG. 9 (a) shows a perspective view of the magnetic-field cancellation type transformer T2, and FIG. 9 (b) shows a vertical cross section view taken along line B-B in FIG. 9 (a).

Parts forming the magnetic-field cancellation type transformer T2 are the same as those for the magnetic-field cancellation type transformer T1, and a difference is in that the primary winding L3 and the secondary winding L4 are wound such as to be alternately piled (for example, see JP application 2008-113326).

As shown, because the primary winding L3 and the secondary winding L4 are laminated such that the primary winding L3 and L4 are alternately piled, DC residual flux is reduced, the core being further down-sized. Accordingly, the magnetic-field cancellation type transformer T forming the magnetic component in the bidirectional boosting-bucking magnetic-field cancellation type of DC/DC converter 10 according to the embodiment can be down-sized and weight-saved.

Figure 10:
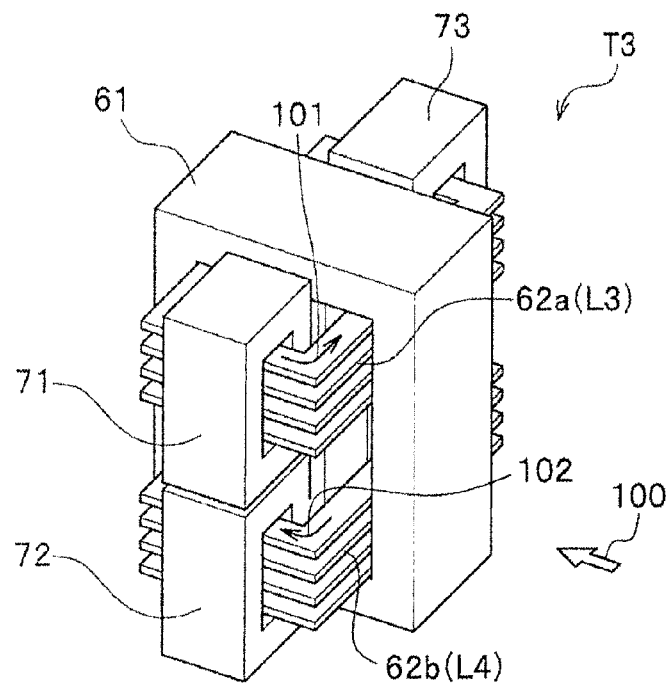
FIG. 10 shows diagrams for illustrating a transformer T3 of the DC converter according to the present invention, wherein (a) is a perspective view and (b) is a cross section view.
Figure 10:
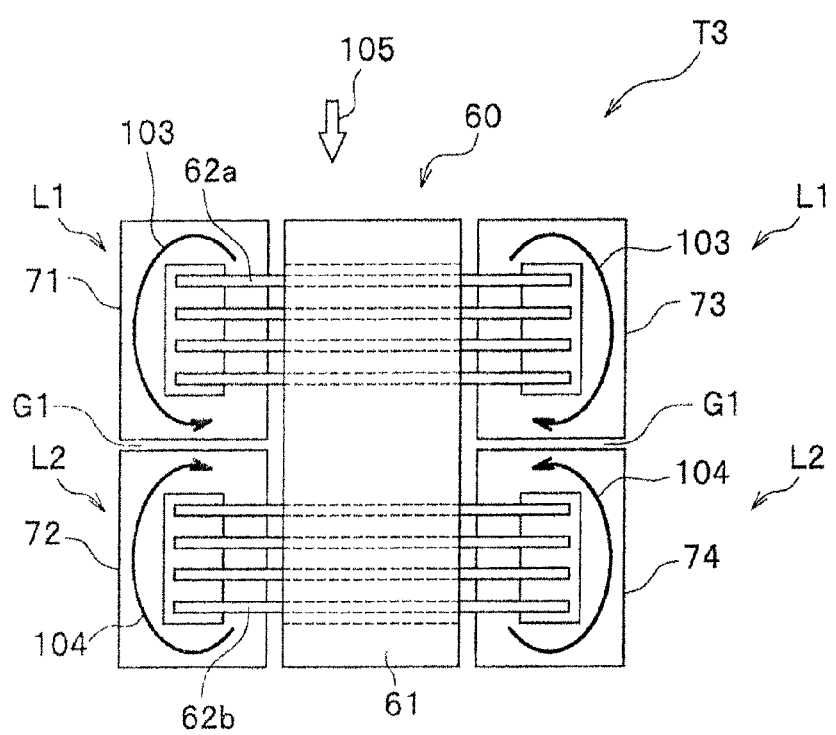
Figure 11:
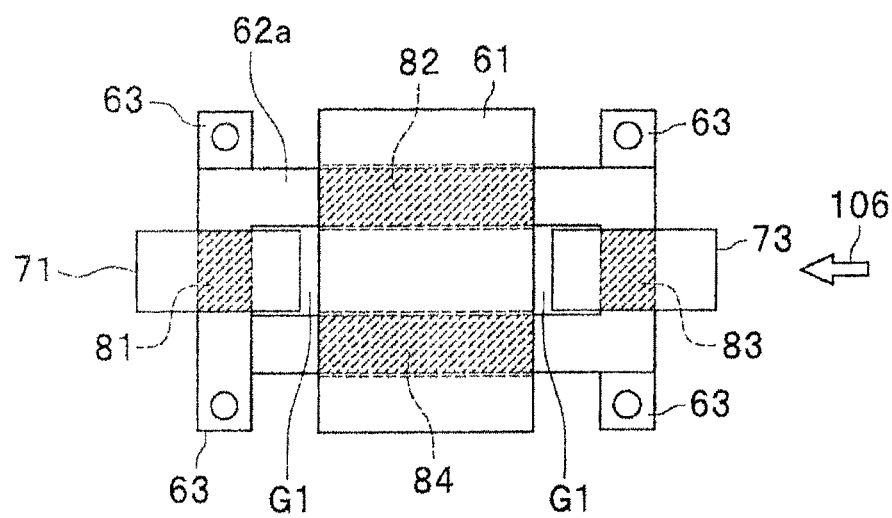
FIG. 11 shows diagrams for illustrating a transformer T3 of the DC converter according to the present invention, wherein (a) is a top view and (b) is a side view.
Figure 11:
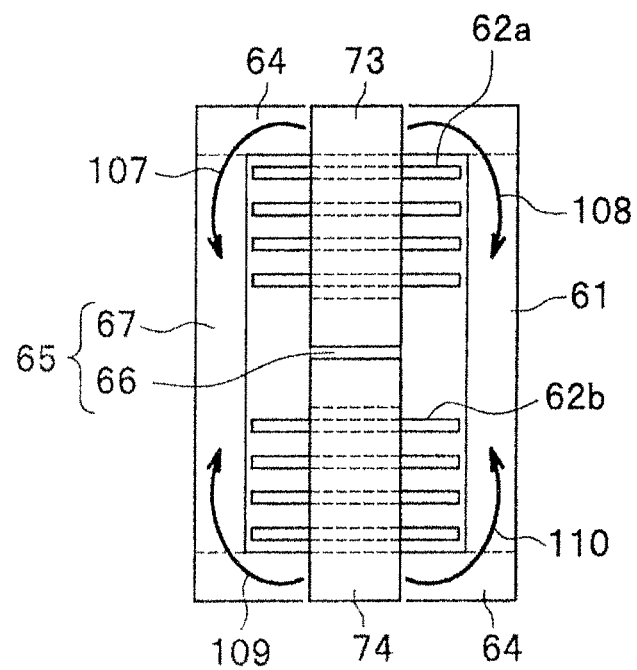

With reference to FIGS. 10 and 11, will be described the magnetic-field cancellation type transformer T3. FIG. 10 (a) shows a perspective view of the magnetic-field cancellation type transformer T3, and FIG. 10 (b) shows a front view viewed from a direction indicated by a hollow arrow 100 in FIG. 10(a). In addition, FIG. 11 (a) is a top view viewed from a direction indicated by a hollow arrow 105 in FIG. 10 (b), and FIG. 11 (b) is a side view viewed from a direction indicated by a hollow arrow 106 in FIG. 11 (a).

The magnetic-field cancellation type transformer T3 includes, as components of the core, a transformer core around which a primary winding and a secondary winding are individually wound and first and second inductor cores formed side by side with the transformer core. The primary winding is commonly used as a coil for a first inductor and wound around the core for the first inductor, and the secondary winding is commonly used as a coil for a second inductor and wound around the core for the second inductor (see JP 2008-192931 A).

In other words, the magnetic-field cancellation type transformer T3 is a combined type of transformer in which the inductors L1 and L2, and the magnetic-field cancellation type transformer T which are magnetic components of the bidirectional boosting-bucking magnetic-field cancellation type of DC/DC converter 10 according to the present invention are integrated each other with functions collected.

As shown in FIGS. 11 (a) and 10 (b), the magnetic-field cancellation type transformer T3 is equivalently configured to include a transformer 60 and inductances L1 and L2. The transformer 60 out of them has a winding 62a that will be the primary winding L3 and a winding 62b that will be the secondary winding L4 separately wound around a transformer core 61.

The primary winding L3 and the secondary winding L4 are magnetically coupled to each other via the transformer core 61, and connected in a reverse winding manner at a substantially same turn ratio. In the present embodiment, the winding 62a is wound in such a direction that a right-hand screw goes forward from the bottom to the top in FIG. 10 (a), and the winding 62b is wound in such a direction that a right-hand screw goes forward from the top to the bottom in FIG. 10 (a). A current flows through the winding 62a in a direction of an arrow denoted by a reference numeral 101, while a current flows through the winding 62b in a direction of an arrow denoted by a reference numeral 102.

The inductor L1 includes an inductor first core 71, an inductor third core 73, and a winding 62a wound around the inductor first core 71 and around the inductor third core 73. Likewise, the inductor L2 includes an inductor second core 72, an inductor fourth core 74, and the winding 62b wound around the inductor second core 72 and around the inductor fourth core 74.

The winding 62a extends outwardly of the transformer core 61, and the extending part of the winding 62a is wound around the inductor first core 71 and around the inductor second core 72 (hereinafter, referred to as inductor cores 71, 72). Likewise, the winding 62b extends outwardly of the transformer core 61, and the extending part of the winding 62b is wound around the inductor third core 73 and around the inductor fourth core 74 (hereinafter, referred to as inductor cores 73, 74). The inductor cores 71, 72 are arranged at opposite locations to the inductor cores 73, 74 across the transformer core 61. Note that the inductor L1 may be formed by the inductor core 71 or the inductor core 73, while the inductor L2 may be formed by the inductor core 72 or the inductor core 74. As shown in FIG. 11 (a), the windings 62a, 62b each have terminals 63 at an input side and an output side. A gap G1 is formed between the inductor cores 71, 72, 73, 74, and the transformer core 61 in order to separate adjoining magnetic fluxes. As shown in FIG. 10 (b), a gap G1 is likewise formed between the inductor cores 71, 72 and the inductor cores 73, 74 in order to separate magnetic fluxes up and down.

As shown in FIG. 11 (b), the transformer core 61 has bases 64 provided above and below the windings 62a, 62b, and a magnetic leg portion 65 provided between the two bases 64. The magnetic leg portion 65 is a part for forming a closed magnetic path by magnetic flux generated by the windings 62a, 62b. The base 64 fixes the magnetic leg portion 65, and form the closed magnetic path together with the magnetic leg portion 65. The magnetic leg portion 65 has a middle leg portion 66 around which the windings 62a, 62b are wound, and outer leg portions 67 formed side by side with the middle leg portion 66.

As explained above, the magnetic-field cancellation type transformer T3 has a basic structure as the transformer 60 comprising the transformer core 61 and the windings 62a, 62b which extend outwardly of the transformer core 61. The inductor cores 71, 72, 73, and 74 are additionally provided by utilizing the extending portions of the coil to form the two inductors L1, L2.

Next, will be described an operation of the magnetic-field cancellation type transformer T3. As shown in FIG. 10 (a), when a current flows through the winding 62a in the direction of the arrow denoted by a reference numeral 101, a magnetic flux is generated in the inductor first core 71 in a direction of an arrow denoted by a reference numeral 103 as shown in FIG. 10 (b). Moreover, at another timing, as shown in FIG. 10 (a), when a current flows through the winding 62b in the direction of the arrow denoted by a reference numeral 102, magnetic flux is generated in the inductor second core 72 in a direction of an arrow denoted by a reference numeral 104 as shown in FIG. 10 (b).

That is, the inductor cores 71, 73 generate magnetic energy as a current flows through the winding 62a, so that the winding 62a and the inductor cores 71, 73 form a part that functions as the inductor L1. Moreover, the inductor cores 72, 74 generate magnetic energy when a current flows through the winding 62b, so that the winding 62b and the inductor cores 72, 74 form a part that functions as the inductor L2. A hatched area 81 of the windings 62a, 62b shown in FIG. 11 (a) mainly contributes to generation of magnetic flux in the inductor cores 71, 72 as a current flows through each winding 62a, 62b. Likewise, a hatched area 83 shown in FIG. 11(a) mainly contributes to generation of magnetic flux at the inductor cores 73, 74 when a current flows through each winding 62a, 62b.

As shown in FIG. 10 (a), when a current flows through the winding 62a in the direction of the arrow denoted by a reference numeral 101, magnetic fluxes are generated at the transformer core 61 in respective directions of arrows denoted by reference numerals 107, 108, shown in FIG. 11 (b). Moreover, at another timing, as shown in FIG. 10 (a), when a current flows through the winding 62b in the direction of the arrow denoted by a reference numeral 102, a magnetic flux is generated at the transformer core 61 in respective directions of arrows denoted by reference numerals 109, 110 as shown in FIG. 11 (b).

When magnetic flux is generated at the transformer core 61, a magnetic mutual action occurs between the winding 62a and the winding 62b, which brings about a transformation action. Accordingly, the two windings 62a, 62b and the transformer core 61 form a part that functions as the transformer 60. Hatched areas 82, 84 in the windings 62a, 62b shown in FIG. 11(a) mainly contribute to generation of magnetic flux when a current flows through each of the winding 62a, 62b.

As explained above, the magnetic-field cancellation type transformer T3 has the windings 62a, 62b of the transformer 60 commonly used as the coils for the inductors L1, L2, and the transformer 60 and the inductors L1, L2 are realized with an integrated structure by merely additionally providing the inductor cores 71, 72, 73, and 74 to the windings 62a, 62b of the transformer 60. By using such the magnetic-field cancellation type transformer T3 in the bidirectional boosting-bucking magnetic-field cancellation type of DC/DC converter 10, the magnetic-field cancellation type transformer T3 which functions not only as the inductors L1, L2 but also as the transformer 60 can be miniaturized.

In other words, the magnetic-field cancellation type transformer T3 is a combined type of transformer in which the inductors L1 and L2, and the magnetic-field cancellation type transformer T which are magnetic components of the bidirectional boosting-bucking magnetic-field cancellation type of DC/DC converter 10 according to the present invention are integrated each other with functions collected.

Accordingly, the magnetic-field cancellation type transformer T3 can down-size and weight-save the inductor L1 and the inductor L2 forming the magnetic components in the bidirectional boosting-bucking magnetic-field cancellation type of DC/DC converter 10 according to the embodiment.

As described above, the bidirectional boosting-bucking magnetic-field cancellation type of DC/DC converter 10 according to the embodiment can perform a bidirectional boosting-bucking operation in which a boosting rate and bucking rate is variable and magnetic components are down-sized and weight-saved.

According to the bidirectional boosting-bucking magnetic-field cancellation type of DC/DC converter 10 of the embodiment can provide an increased function, a down-sizing, and weight-reduction in the components of the power converter for electric driving system and electric assist system for vehicles.

As described above, the present invention is not limited to the embodiment. For example, the present invention is applicable to a power converter for electric driving system and electric assist system for, for example, a fuel cell vehicles (FCV), a hybrid electric vehicle (HEV), an electric vehicle (EV), and a solar power generation system.

DESCRIPTION OF REFERENCES 10 bidirectional boosting-bucking magnetic-field cancellation type of DC/DC converter
20 controller
30, 64 base
40, 65 magnetic leg portion
41, 66 middle leg portion
42, 67 outer leg portion
50 core
60 transformer
61 transformer core
62a winding (primary winding)
62b winding (secondary winding)
63 terminal
71 inductor first core
72 inductor second core
73 inductor third core
74 inductor fourth core
81, 82, 83, 84 diagonally-hatched region P1 first voltage port
P2 second voltage port
CP common reference terminal
V1 first voltage
V2 second voltage
C1, C2 smoothing capacitor
SW1, SW2, SW3, SW4, SW5, SW6, SW7, SW8 switching element
td dead time
L1 inductor (first inductor)
L2 inductor (second inductor)
L3 primary winding
L4 secondary winding
T, T1, T2 magnetic-field cancellation type transformer
T3 magnetic-field cancellation type transformer (combined type of transformer)
G1 gap

The invention claimed is:

1. A DC/DC converter comprising:
a first-voltage-side port that is a first positive electrode, a second-voltage-side port that is a second positive electrode, a common reference terminal, a plurality of switching elements, a plurality of inductors, and a transformer, characterized in that
one end of the first switching element and one end of the second switching element are connected to the first voltage-side port; wherein
one end of the first inductor is connected to an other end of the first switching element; wherein
one end of the second inductor is connected to an other end of the second switching element; wherein
one end of the third switching element is connected to the other end of the first switching element; wherein
one end of the fourth switching element is connected to the other end of the second switching element; wherein
other ends of the third switching element and the fourth switching element are connected to the common reference terminal; wherein
the transformer comprises a magnetic-field cancellation type transformer comprising:
a primary winding and a secondary winding, wherein the primary winding and the secondary winding are magnetically coupled with each other through a core and have substantially the same winding ratios with an opposite direction connection; wherein
one end of the primary winding is connected to an other end of the first inductor; wherein
one end of the secondary winding is connected to an other end of the second inductor; wherein
one end of the fifth switching element and one end of sixth switching element are connected to the second-voltage-side port; wherein
an other end of the fifth switching element is connected to an other end of the primary winding; wherein
an other end of the sixth switching element is connected to an other end of the secondary winding; wherein
one end of the seventh switching element is connected to the other end of the primary winding; wherein
one end of the eighth switching element is connected to the other end of the secondary winding;
other ends of the seventh switching element and the eighth switching element are connected to the common reference terminal.

2. The DC/DC converter as claimed in claim 1, wherein on-and-off control signals are supplied by a controller externally installed to the seventh and eighth switching elements to alternately control on-and-off operations of the respective seventh and eighth switching elements to boost the first voltage to the second voltage.

3. The DC/DC converter as claimed in claim 1, wherein on-off control signals are supplied by a controller externally installed to the fifth and sixth switching elements to alternately control on-off operations of the respective fifth and sixth switching elements to buck the second voltage to the first voltage.

4. The DC/DC converter as claimed in claim 1, wherein on-off control signals are supplied by a controller externally installed to the first and second switching elements to alternately control on-off operations of the respective first and second switching elements to buck the first voltage to the second voltage.

5. The DC/DC converter as claimed in claim 1, wherein on-off control signals are supplied by a controller externally installed to the third and fourth switching elements to alternately control on-off operations of the respective third and fourth switching elements to boost the second voltage to the first voltage.

6. The DC/DC converter as claimed in claim 1, wherein on-off control signals are supplied by a controller externally installed to the fifth to eighth switching elements to alternately control on-off operations of the respective fifth and seventh switching elements and on-off control signals to the sixth and eighth switching elements to alternately control on-off operations of respective the sixth and eighth switching elements to boost the first voltage to the second voltage and buck the second voltage to the first voltage at different timing.

7. The DC/DC converter as claimed in claim 1, wherein on-off control signals are supplied by a controller externally installed supplies to the first to fourth switching elements to alternately control on-off operations of the respective first and third switching elements, and on-off control signals to the respective second and fourth switching elements to alternately control on-off operations of the respective second and fourth switching elements to buck the first voltage to the second voltage and boost the second voltage to the first voltage at different timing.

8. The DC/DC converter as claimed in claim 1, wherein the core of the magnetic-field cancellation type transformer, comprises:
a magnetic leg portion around which the primary and secondary windings are individually wound, the magnetic leg portion forming a magnetic closed circuit by a magnetic field generated by the primary and secondary windings; and
a base fixing the magnetic leg portion, forming the magnetic closed circuit together with the magnetic leg portion; wherein the magnetic leg portion comprises:
a middle leg portion around which the primary and the secondary windings are wound; and
an outer leg portion formed side by side with the middle leg portion.

9. The DC/DC converter as claimed in claim 1, wherein the core of the magnetic-field cancellation type transformer, comprises:
a magnetic leg portion around which the primary and secondary windings are wound such that the primary and secondary windings are alternately piled, the magnetic leg portion forming a magnetic closed circuit by a magnetic field generated by the primary and secondary windings; and
a base, fixing the magnetic leg portion, forming the magnetic closed circuit together with the magnetic leg portion, wherein the magnetic leg portion comprises:
a middle leg portion around which the primary and the secondary windings are wound; and
an outer leg portion formed side by side with the middle leg portion.

10. The DC/DC converter as claimed in claim 1, wherein the core of the magnetic-field cancellation type transformer comprises:
a magnetic leg portion around which the primary and secondary windings are individually wound, the magnetic leg portion forming a magnetic closed circuit by a magnetic field generated by the primary and secondary windings; and
a base, fixing the magnetic leg portion, forming the magnetic closed circuit together with the magnetic leg portion; wherein
the magnetic leg portion comprises:
a middle leg portion around which the primary and the secondary windings are wound; and
an outer leg portion formed side by side with the middle leg portion, wherein
a first inductor core and a second inductor core are vertically disposed one on another on at least a position facing the middle leg portion, wherein,
the primary winding is wound around the middle leg portion and commonly used as a coil for the first inductor and wound around the first inductor core, and wherein
the secondary winding is wound around the middle leg portion and commonly used as a coil for the second inductor and wound around the second inductor core.

11. The DC/DC converter as claimed in claim 1, wherein the first to eighth switching elements comprise Insulated Gate Bipolar Transistor (IGBT) with flywheel diodes.

12. The DC/DC converter as claimed in claim 1, wherein the first to eighth switching elements comprises Metal Oxide Semiconductor Field Effect Transistors (MOSFET).

* * * * *